(12) United States Patent
Liang

(10) Patent No.: US 11,703,656 B2
(45) Date of Patent: Jul. 18, 2023

(54) LENS MOUNT, OPTICAL ELEMENT, AND LENS MODULE

(71) Applicant: Newmax Technology Co., Ltd., Taichung (TW)

(72) Inventor: Yung-Fu Liang, Taichung (TW)

(73) Assignee: Newmax Technology Co., Ltd., Taichung (TW)

( * ) Notice: Subject to any disclaimer, the term of this patent is extended or adjusted under 35 U.S.C. 154(b) by 464 days.

(21) Appl. No.: 16/575,858

(22) Filed: Sep. 19, 2019

(65) Prior Publication Data

US 2021/0088746 A1 Mar. 25, 2021

(51) Int. Cl.
    *G02B 7/02* (2021.01)

(52) U.S. Cl.
    CPC ............ *G02B 7/026* (2013.01); *G02B 7/021* (2013.01)

(58) Field of Classification Search
    CPC .......... G02B 7/02; G02B 7/021; G02B 7/022; G02B 7/023; G02B 7/025; G02B 7/026; G02B 7/027; G02B 7/028
    See application file for complete search history.

(56) References Cited

U.S. PATENT DOCUMENTS

| | | | |
|---|---|---|---|
| 2015/0253569 A1* | 9/2015 | Lin | G02B 5/005 |
| | | | 359/503 |
| 2019/0018171 A1* | 1/2019 | Chang | G02B 7/025 |
| 2020/0408966 A1* | 12/2020 | Wei | G03B 11/045 |
| 2021/0063674 A1* | 3/2021 | Chen | G02B 7/022 |

FOREIGN PATENT DOCUMENTS

| | | |
|---|---|---|
| TW | I612354 B | 1/2018 |
| TW | I616697 B | 3/2018 |
| TW | I616698 B | 3/2018 |
| TW | I639029 B | 10/2018 |

* cited by examiner

*Primary Examiner* — Ephrem Z Mebrahtu

(74) *Attorney, Agent, or Firm* — Bruce Stone LLP; Joseph A. Bruce

(57) ABSTRACT

An optical element is ring-shaped and has an inner peripheral face. The inner peripheral face is formed with a bumpy section. The bumpy section is formed with a plurality of grooves. The grooves are disposed around an axial direction of the optical element. A rib is formed between any adjacent two of the grooves. Each of the grooves has a fifth end and a sixth end along the axial direction. A width of each of the grooves along a circumferential direction is increasing from the sixth end toward the fifth end so that a third angle between two lateral walls of each of the grooves is larger than 0 degree but smaller than 90 degrees.

18 Claims, 13 Drawing Sheets

LENS MOUNT, OPTICAL ELEMENT, AND LENS MODULE

BACKGROUND OF THE INVENTION

Field of the Invention

The present invention relates to a lens mount, an optical element, and a lens module.

Description of the Prior Art

A lens module is usually composed of a lens mount and a plurality of lenses. The lens mount has plural stepped faces on the inner peripheral face for the lenses to abut against in order to make the positions of the lenses precise. A positioning ring fixed at an end of the lens mount having a larger inner diameter is often used to prevent the lens from falling for protection.

The positioning ring is usually positioned to the lens mount by tight-fitting or engaging structure. Patent TW 1616698 disclosed another means to position the positioning ring. The inner peripheral face of the lens mount is formed with plural grooves extending axially, and the grooves are injected with adhesive to fix the positioning ring.

To provide larger contact area between the lens mount and the positioning ring, the number of the grooves has to be reduced, or narrower grooves have to be used. However, the narrower grooves are difficult to inject the adhesive. In addition, the adhesive may flow to the lens to contaminate the lens.

Besides, optical elements such as the spacer or the positioning ring are necessary for the lens module. However, stray light is generated when light projects on those optical elements.

To solve the problem, bumpy surface is usually used to dissipate the stray light, as shown in patents TW 1612354, TW 1616697, and TW 1639029. The bumpy surface is usually formed around the optical portion of the lens or on the inner peripheral face of the positioning ring.

However, the bumpy surface has an even shape, such as concentric annular grooves or radial linear grooves. The surface for reflecting light is even, and the stray light may be concentrated in some cases.

SUMMARY OF THE INVENTION

The main object of the present invention is to provide a lens mount, an optical element, and a lens module having a special bumpy structure for injection of adhesive or stray light dissipation.

To achieve the above and other objects, the lens mount of the present invention is cylinder-shaped and has an inner peripheral face. The inner peripheral face encloses a receiving space to receive at least one optical element. The lens mount has a first end and a second end along an axial direction thereof. The inner peripheral face has a ring-shaped bumping section near the first end. The bumping section has a plurality of grooves disposed around the axial direction of the lens mount. A rib is formed between any adjacent two of the grooves. An end of each of the grooves closer to the first end is defined as a third end, and an end of each of the grooves closer to the second end is defined as a third end. A width of each of the grooves along a circumferential direction is increasing from the fourth end toward the third end so that an angle between two lateral walls of each of the grooves is larger than 0 degree but smaller than 90 degrees.

To achieve the above and other objects, the optical element of the present invention is ring-shaped and has an inner peripheral face. The inner peripheral face is formed with a bumpy section. The bumpy section is formed with a plurality of grooves. The grooves are disposed around an axial direction of the optical element. A rib is formed between any adjacent two of the grooves. Each of the grooves has a fifth end and a sixth end along the axial direction. A width of each of the grooves along a circumferential direction is increasing from the sixth end toward the fifth end so that a third angle between two lateral walls of each of the grooves is larger than 0 degree but smaller than 90 degrees.

To achieve the above and other objects, the lens module of the present invention is includes a lens mount, at least one lens, and a positioning ring.

The lens mount is cylinder-shaped and has an inner peripheral face. The inner peripheral face encloses a receiving space. The lens mount has a first end and a second end along an axial direction. The inner peripheral face has a positioning section near the first end. The at least one lens is arranged in the receiving space. An outer peripheral face of the at least one lens is connected to the inner peripheral face of the lens mount. The positioning ring is arranged in the receiving space. An outer peripheral face of the positioning ring is connected to the positioning section of the lens mount to prevent the at least one lens from falling out. At least one of the positioning section and the outer peripheral face of the positioning ring includes a ring-shaped bumpy section. The bumpy section has a plurality of grooves for being injected with an adhesive. The grooves are disposed around the axial direction of the lens mount. A rib is formed between any adjacent two of the grooves. An end of each of the grooves closer to the first end is defined as a third end, and an end of each of the grooves closer to the second end is defined as a fourth end. A width of each of the grooves along a circumferential direction is increasing from the fourth end toward the third end so that a first angle between two lateral walls of each of the grooves is larger than 0 degree but smaller than 90 degrees.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
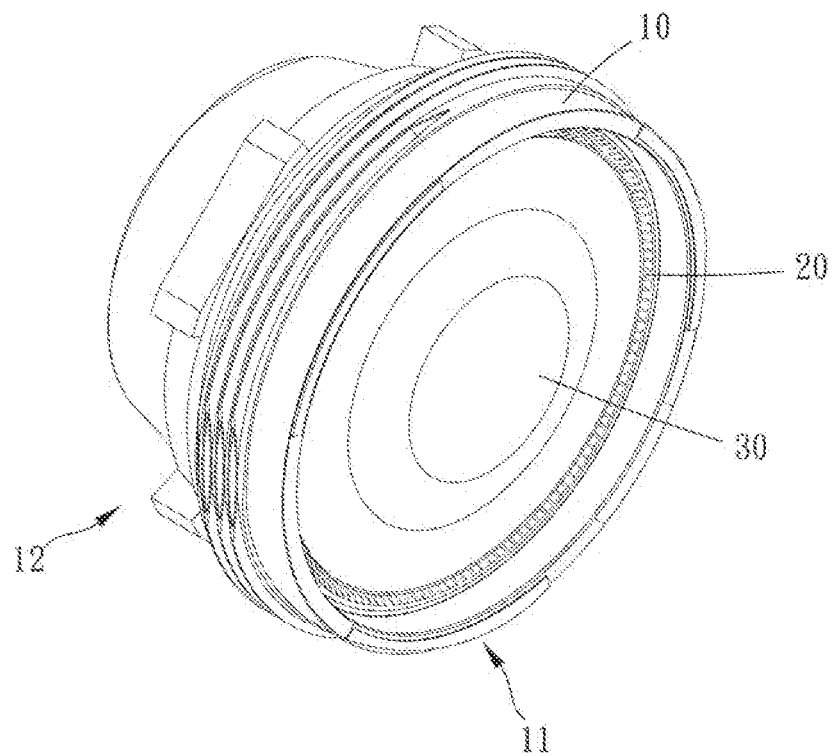
FIG. 1 is a stereogram showing a lens module of the present invention.
Figure 2:
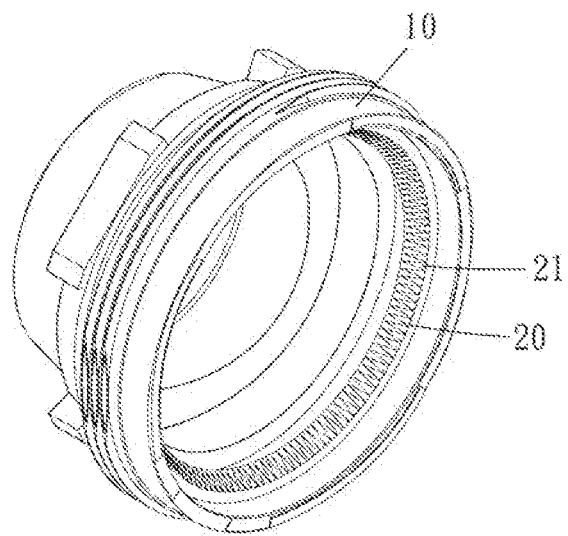
FIG. 2 is a stereogram showing a lens mount and a positioning ring of the present invention.
Figure 3:
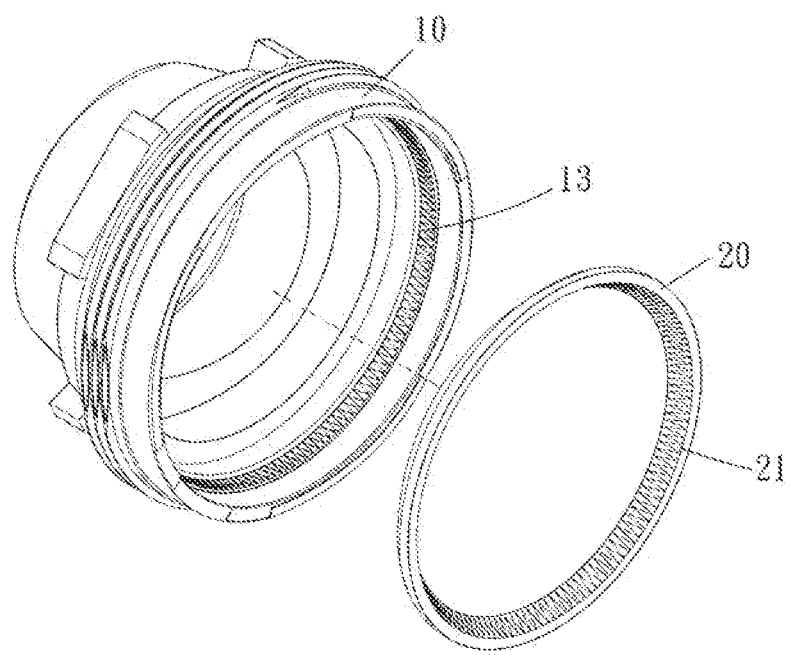
FIG. 3 is a breakdown drawing showing a lens mount and a positioning ring of the present invention.
Figure 4:
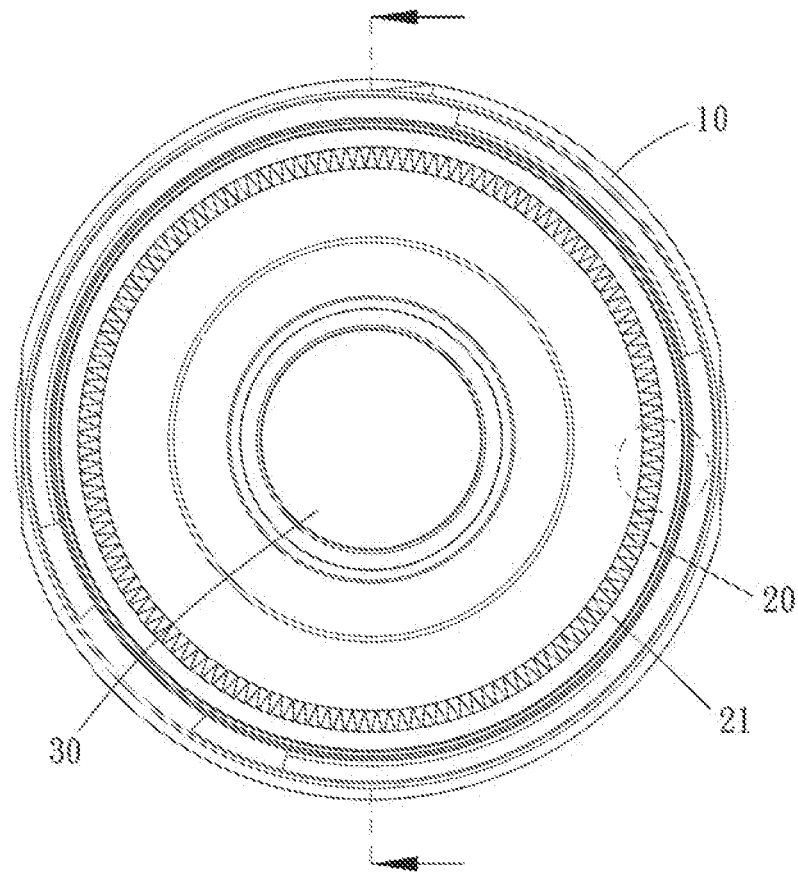
FIG. 4 is a front view showing a lens module of the present invention.
Figure 5:
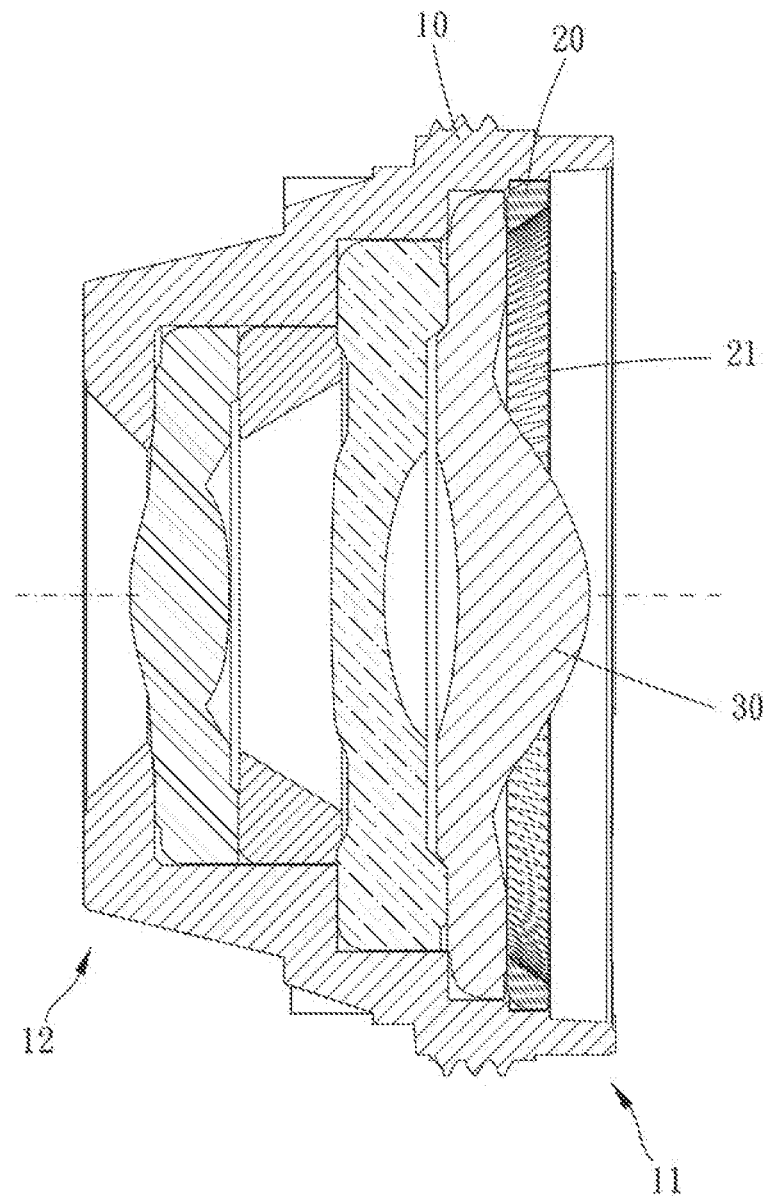
FIG. 5 is a cross-section showing a lens module of the present invention.
Figure 6:
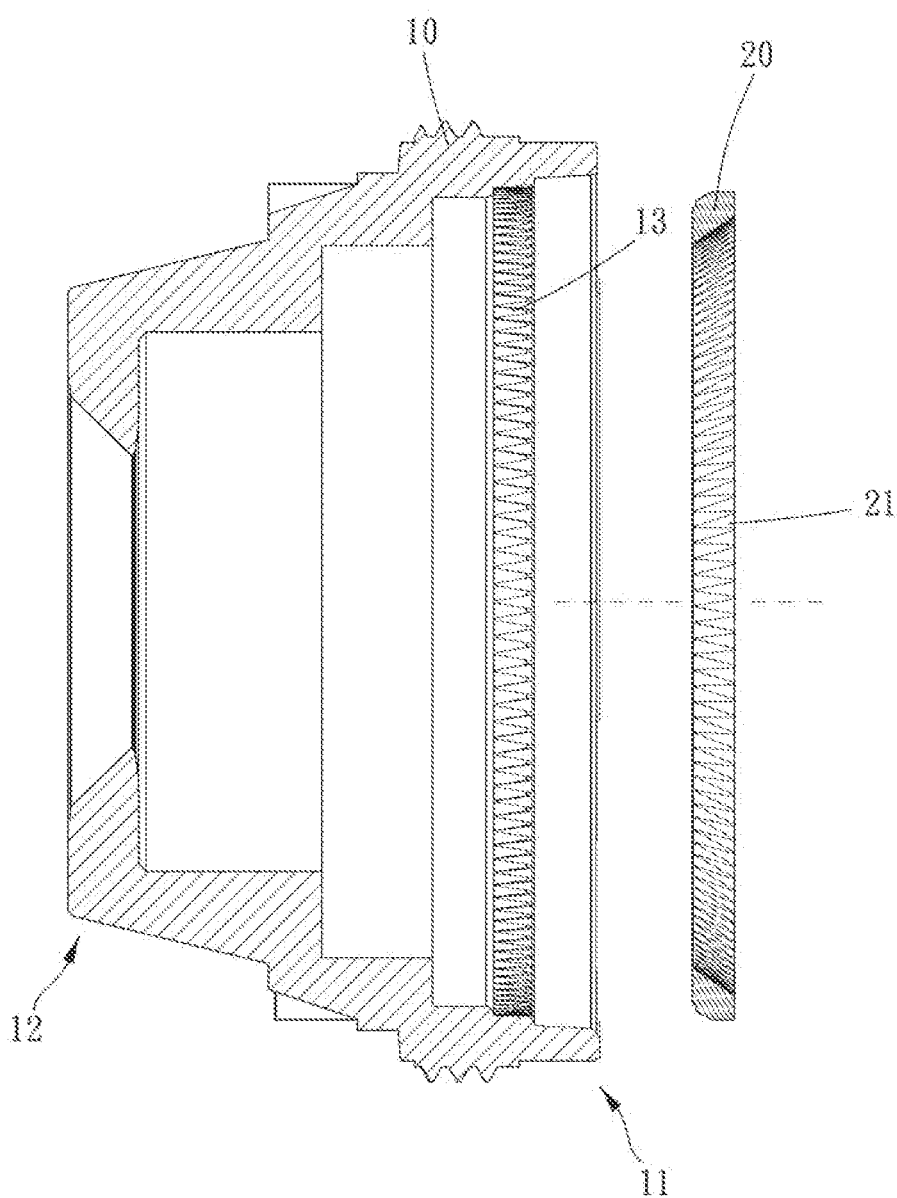
FIG. 6 is a cross-section showing a lens mount and a positioning ring of the present invention.
Figure 7:
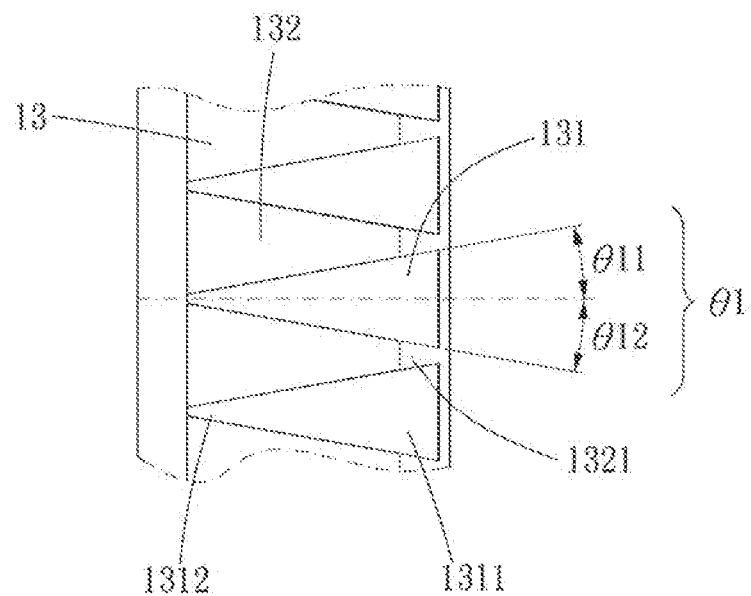
FIG. 7 is a partial lateral view showing a bumpy section of the present invention.
Figure 8:
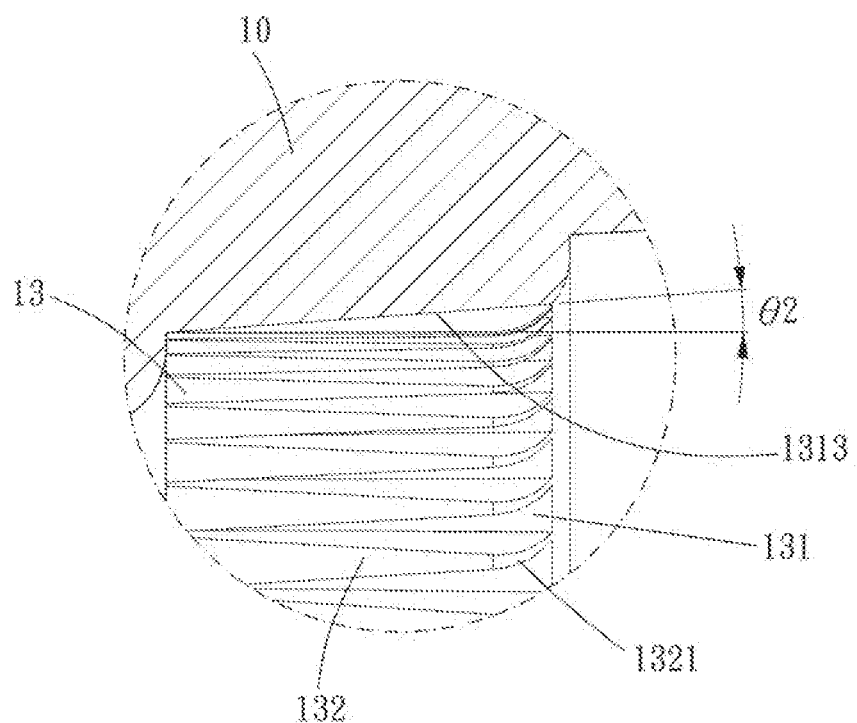
FIG. 8 is a partial enlargement of FIG. 6.
Figure 9:
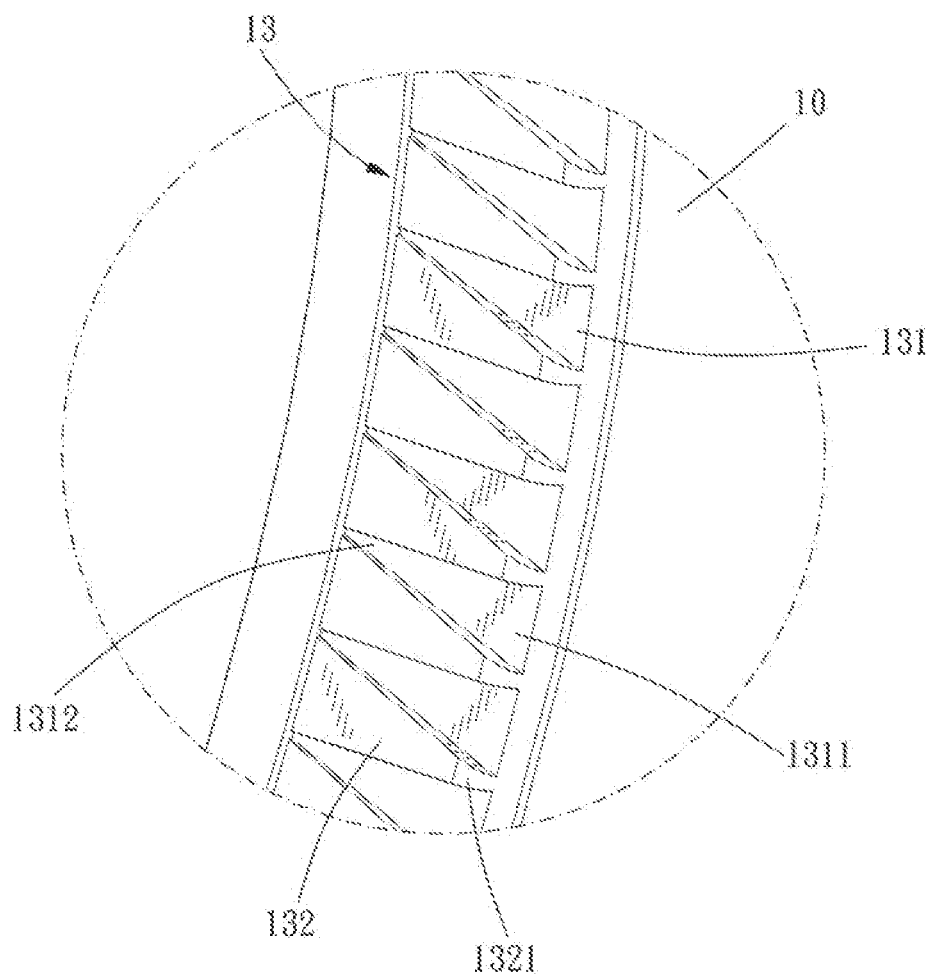
FIG. 9 is a partial stereogram showing a bumpy section of the present invention.
Figure 10:
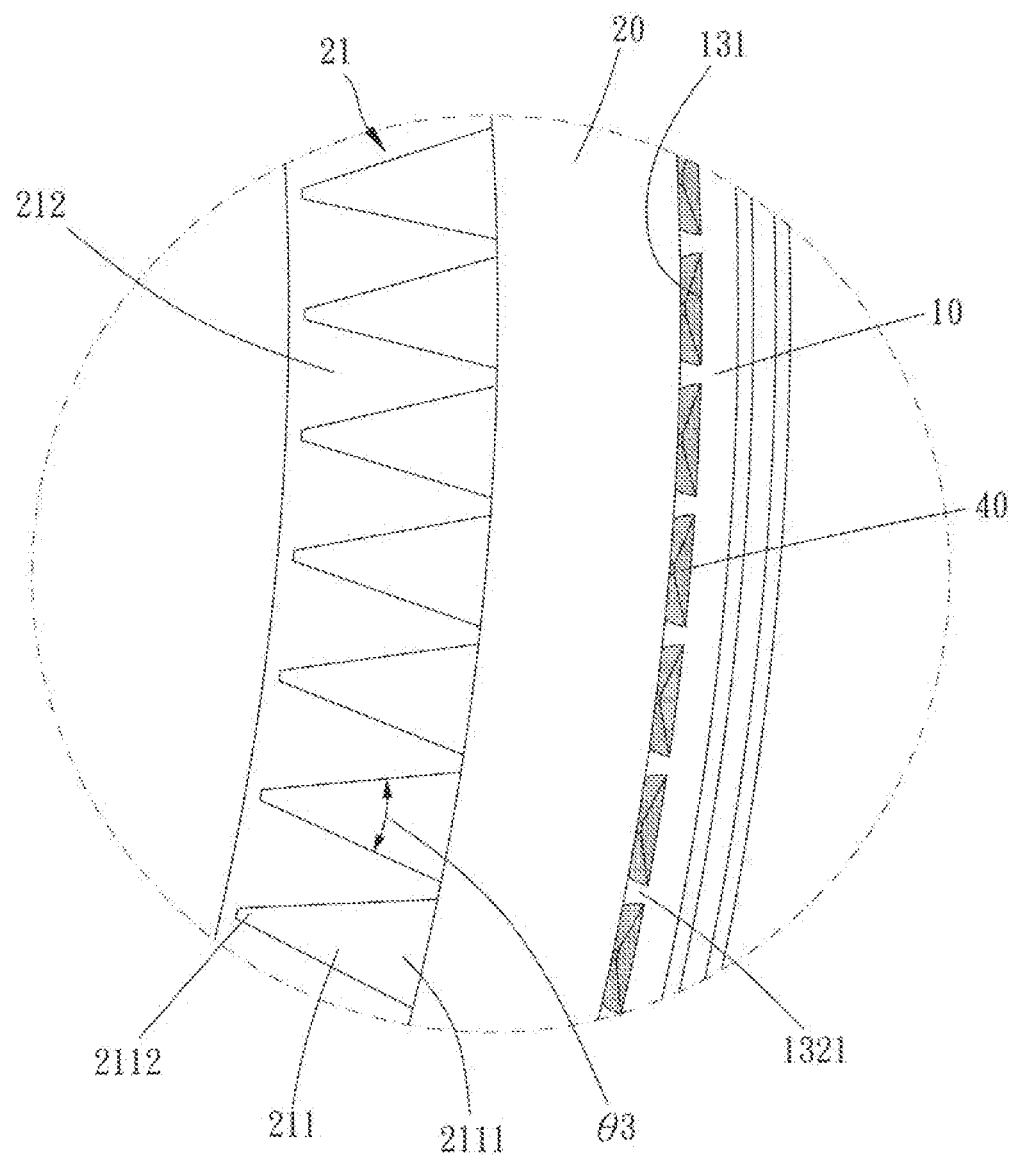
FIG. 10 is a partial stereogram showing a lens mount and a positioning ring of the present invention.

Please refer to FIG. 1 to FIG. 10, the lens mount 10 of the present invention is cylinder-shaped and has an inner peripheral face. The inner peripheral face encloses a receiving space to receive at least one optical element. The lens mount 10 has a first end 11 and a second end 12 along an axial direction. The inner peripheral face has a ring-shaped bumpy section 13 near the first end 11. The bumpy section 13 includes a plurality of grooves 131 disposed around the axial direction of the lens mount 10. A rib 132 is formed between any adjacent two of the grooves 131. Preferably, the top face of each of the ribs 132 is parallel to the axial direction. Each of the grooves 131 has an third end 1311 closer to the first end 11 and a fourth end 1312 closer to the second end 12. The width of each of the grooves 131 along a circumferential direction is increasing from the fourth end 1312 toward the third end 1311 so that a first angle θ1 between two lateral walls of each of the grooves 131 is larger than 0 degree but smaller than 90 degrees.

The present invention also provides an optical element (such as a positioning ring 20). The optical element is ring-shaped and has an inner peripheral face. The inner peripheral face is formed with a bumpy section 21 having a plurality of grooves 211. The grooves 211 are disposed around an axial direction of the optical element. A rib 212 is formed between any adjacent two of the grooves 211. Each of the grooves 211 has a fifth end 2111 and a sixth end 2112 along the axial direction. The width of each of the grooves 211 is increasing from the sixth end 2112 toward the fifth end 2111 so that a third angle θ3 between two lateral walls of each of the grooves 211 is larger than 0 degree but smaller than 90 degrees.

The present invention further provides a lens module including a lens mount 10, at least one lens 30, and a positioning ring 20.

The lens mount 10 is cylinder-shaped and has an inner peripheral face. The inner peripheral face encloses a receiving space. The lens mount 10 has a first end 11 and a second end 12 along an axial direction. The inner peripheral face has a positioning section near the first end 11. The at least one lens 30 is arranged in the receiving space. An outer peripheral face of the at least one lens 30 is connected to the inner peripheral face of the lens mount 10. The positioning ring 20 is arranged in the receiving space. An outer peripheral face of the positioning ring 20 is connected to the positioning section of the lens mount 10 to prevent the at least one lens 30 from falling out. At least one of the positioning section and the outer peripheral face of the positioning ring 20 includes a ring-shaped bumpy section 13. The bumpy section 13 has a plurality of grooves 131 for being injected with an adhesive 40. The grooves 131 are disposed around the axial direction of the lens mount 10. A rib 132 is formed between any adjacent two of the grooves 131. An end of each of the grooves 131 closer to the first end 11 is defined as a third end 1311, and an end of each of the grooves 131 closer to the second end 12 is defined as a fourth end 1312. A width of each of the grooves 131 along a circumferential direction is increasing from the fourth end 1312 toward the third end 1311 so that a first angle θ1 between two lateral walls of each of the grooves 131 is larger than 0 degree but smaller than 90 degrees.

In the present embodiment, a contour of each of the grooves 131,211 is an isosceles trapezoid when observed along a radial direction, and a contour of each of the ribs 132 is also an isosceles trapezoid when observed along a radial direction. That is, if the first angle θ1 (or the third angle θ3) is partitioned into a first subangle θ11 and a second subangle θ12 based on the axial direction, the first subangle θ11 and the second subangle θ12 are equal to each other and each of them is larger than 0 degree but smaller than 45 degrees. Preferably, the first angle θ1 (or the third angle θ3) is ranged between 15-25 degrees. However, in other possible embodiments, the contour of each of the grooves is a trapezoid with lateral sides different in length when observed along the radial direction. That is, the first subangle and the second subangle are not equal to each other. Besides, each of the grooves 131,211 has a maximum width and a minimum width along the circumferential direction, and the maximum width is 8-12 times the minimum width. That is, the width of each of the grooves 131,211 at the third end 1311 (or the fifth end 2111) is 8-12 times the width at the fourth end 1312 (or the sixth end 2112).

Besides, a bottom face of each of the grooves 131 is inclined with respect to the axial direction, and a second angle θ2 between the bottom face of each of the grooves 131 and the axial direction is larger than 0 degree but smaller than 45 degrees. Preferably, the second angle θ2 is ranged between 3-10 degrees. Specifically, in the present embodiment, a depth of each of the grooves 131 along a radial direction is increasing from the fourth end 1312 toward the third end 1311. That is, the bottom of each of the grooves 131 approaches the central axis of the lens mount 10 from the third end 1311 toward the fourth end 1312. On the other hand, an end of each of the ribs 132 closer to the first end 11 is formed with a guiding face 1321 which is oblique. The guiding face 1321 faces the first end 11 and the axial direction.

Figure 11:
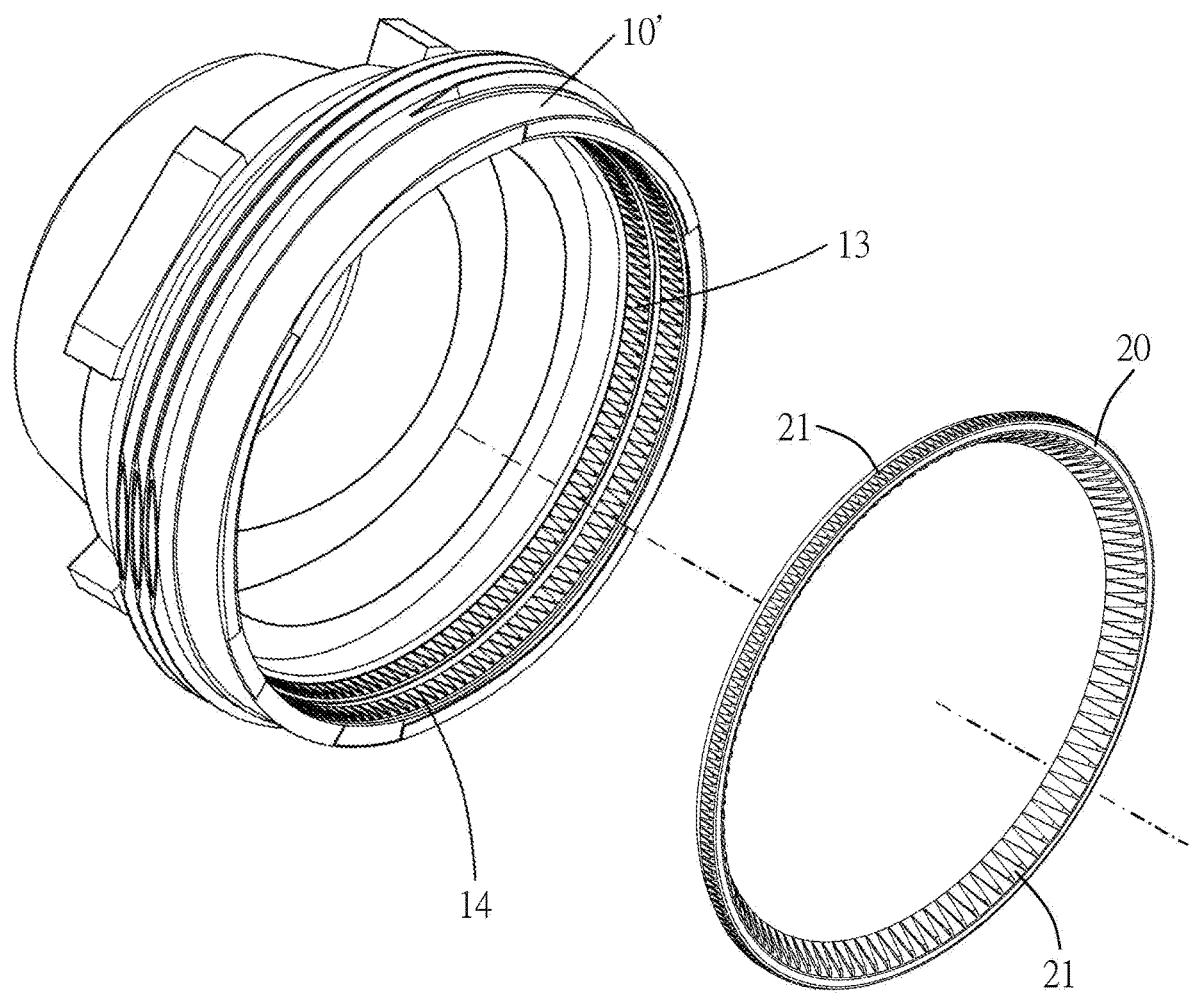
FIG. 11 is a breakdown showing a lens mount and a positioning ring of a second embodiment of the present invention.
Figure 12:
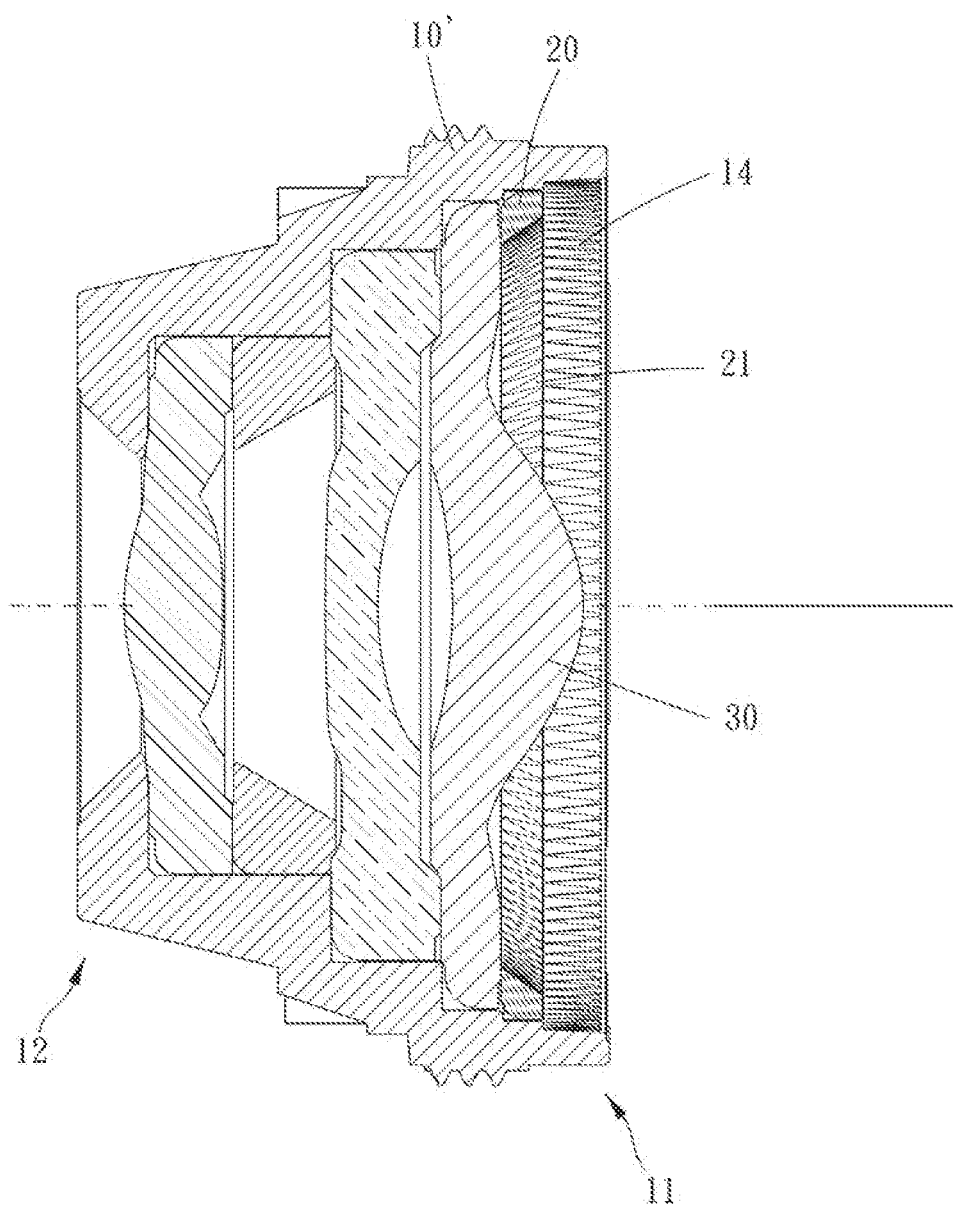
FIG. 12 is a cross-section of a second embodiment of the present invention.
Figure 13:
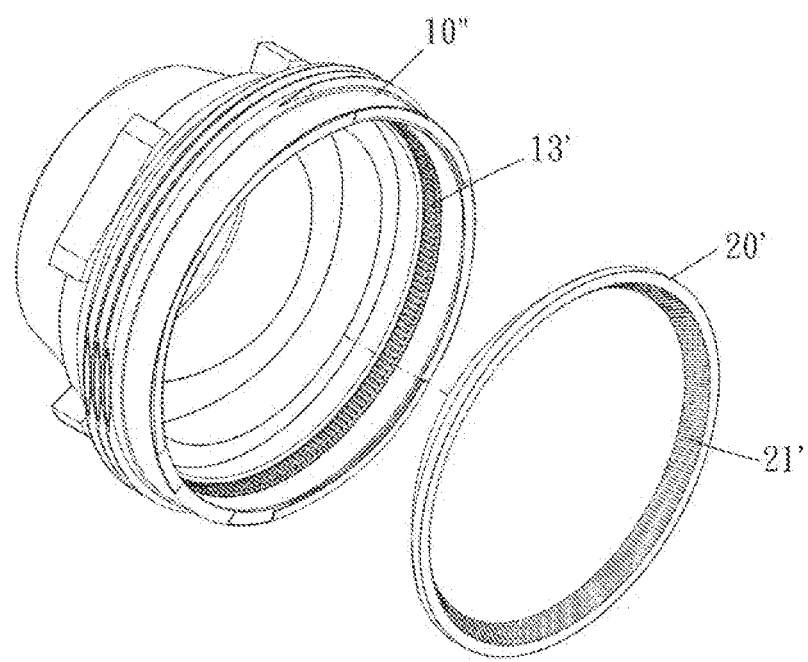
FIG. 13 is a breakdown showing a lens mount and a positioning ring of a third embodiment of the present invention.
Figure 14:
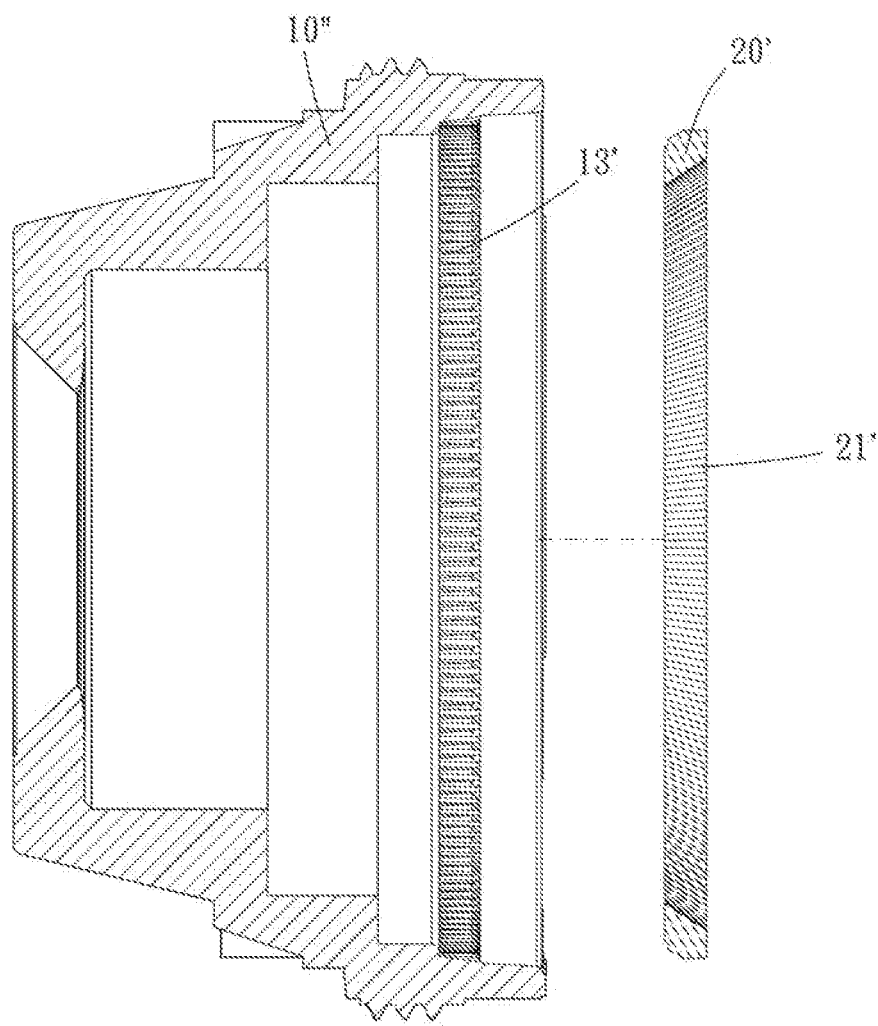
FIG. 14 is a cross-section of a third embodiment of the present invention.
Figure 15:
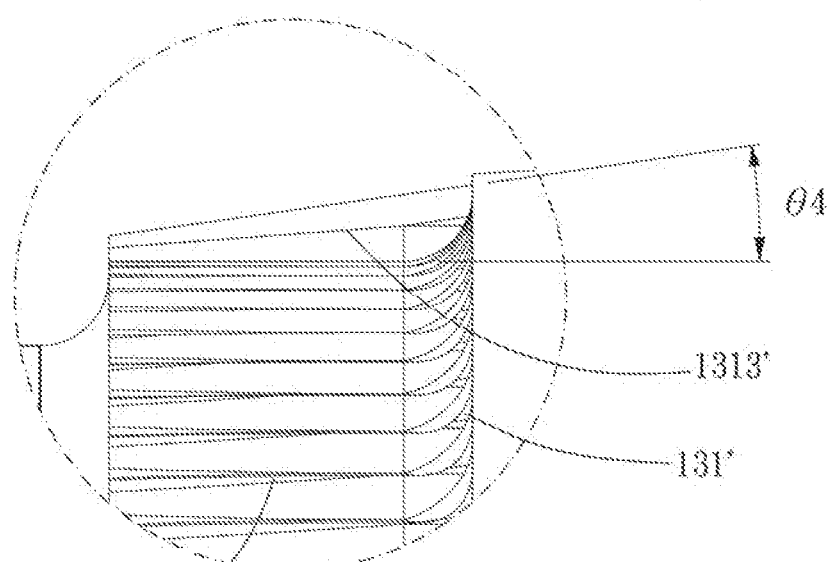
FIG. 15 is a partial enlargement of FIG. 14.
Figure 16:
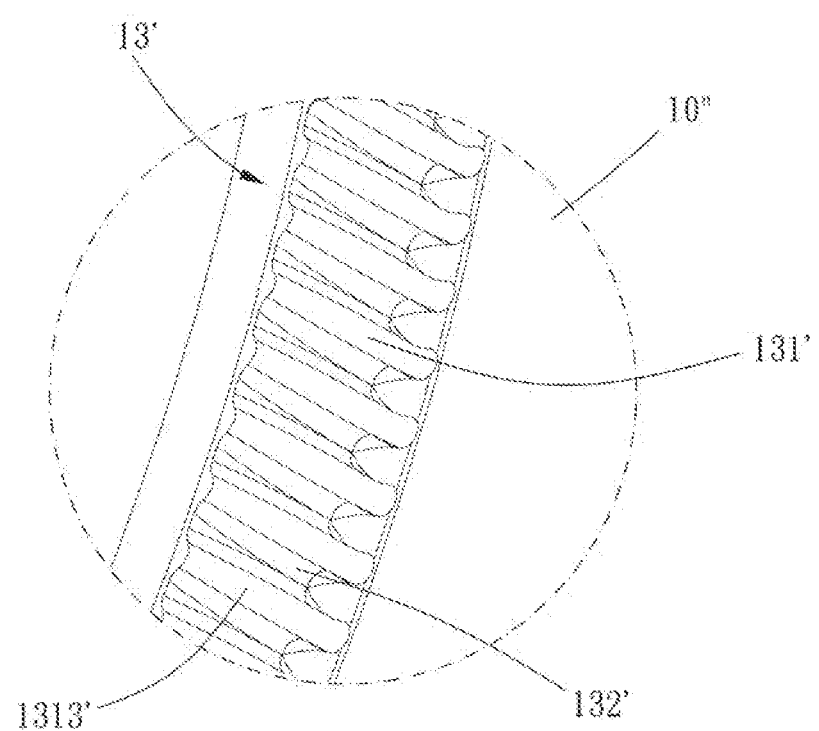
FIG. 16 is a partial stereogram showing a bumpy section of a third embodiment of the present invention.

In the present embodiment, only the positioning section has the bumpy section 13. However, in other possible embodiments, the bumpy section can be formed on the outer peripheral face of the positioning ring or on both the positioning section and the outer peripheral face of the positioning ring. Furthermore, as shown in FIG. 11 and FIG. 12, another bumpy section 14 for dissipating stray light is formed beside the bumpy section 13 on the inner peripheral face of the lens mount 10', and the original bumpy section 13 is used for connecting to the positioning ring 20. Besides, as shown in FIG. 13 to FIG. 16, the lens mount 10" can have a bumpy section 13' in other shapes. The grooves 131' and the ribs 132' are connected wavily. The bottom face 1313' of the groove 131' is inclined with respect to the axial direction, and a fourth angle θ4 between the bottom face 1313' and the axial direction is larger than 0 degree but smaller than 45 degrees so that the radial depth of the groove 131' is increasing from the fourth end toward the third end.

In conclusion, when the bumpy section is formed on the inner peripheral face of the optical element or the inner peripheral face of the lens mount, the lateral walls of the groove are not parallel to the axial direction. That is, the distance from different positions on the lateral walls of the groove to the light axis is not equal. Thus, the stray light can be dissipated. Besides, the bottom face of the groove is also inclined with respect to the axial direction so that the stray light can be further dissipated. On the u) other hand, when the bumpy section is arranged between the positioning ring and the lens mount, the grooves can be injected with adhesive. Because the opening of the groove is wider and deeper, the adhesive is easy to enter. In addition, the internal end of the groove is narrower and shallow, so the adhesive is prevented from flowing to the lens. Furthermore, the bumpy section has a larger surface area of the ribs to increase the contact area between the positioning ring and the lens mount to increase the friction and fixation.

What is claimed is:

1. A lens mount, being cylinder-shaped and having an inner peripheral face, the inner peripheral face enclosing a receiving space to receive at least one optical element, the lens mount having a first end and a second end along an axial direction thereof, the inner peripheral face having a ring-shaped bumping section near the first end, the bumping section having a plurality of grooves disposed around the axial direction of the lens mount, a rib being formed between any adjacent two of the grooves, an end of each of the grooves closer to the first end being defined as a third end, an end of each of the grooves closer to the second end being defined as a fourth end, a width of each of the grooves along a circumferential direction being increasing from the fourth end toward the third end.

2. The lens mount of claim 1, wherein a contour of each of the grooves is an isosceles trapezoid when observed along a radial direction.

3. The lens mount of claim 1, wherein a contour of each of the grooves is a trapezoid with lateral sides different in length when observed along a radial direction.

4. The lens mount of claim 1, wherein a bottom face of each of the grooves is inclined with respect to the axial direction, a second angle between the bottom face of each of the grooves and the axial direction is larger than 0 degree but smaller than 45 degrees.

5. The lens mount of claim 1, wherein a depth of each of the grooves along a radial direction is increasing from the fourth end toward the third end.

6. The lens mount of claim 1, wherein an end of each of the ribs closer to the first end is formed with a guiding face, the guiding face faces the first end and the axial direction.

7. The lens mount of claim 1, wherein a first angle between two lateral walls of each of the grooves is larger than 0 degree but small than 90 degrees.

8. The lens mount of claim 4, wherein the second angle is ranged between 3-10 degrees.

9. The lens mount of claim 7, wherein the first angle is ranged between 15-25 degrees.

10. A lens module, including:
a lens mount, being cylinder-shaped and having an inner peripheral face, the inner peripheral face enclosing a receiving space, the lens mount having a first end and a second end along an axial direction, the inner peripheral face having a positioning section near the first end;
at least one lens, arranged in the receiving space, an outer peripheral face of the at least one lens being connected to the inner peripheral face of the lens mount;
a positioning ring, arranged in the receiving space, an outer peripheral face of the positioning ring being connected to the positioning section of the lens mount to prevent the at least one lens from falling out;
wherein at least one of the positioning section and the outer peripheral face of the positioning ring includes a ring-shaped bumpy section, the bumpy section has a plurality of grooves for being injected with an adhesive, the grooves are disposed around the axial direction of the lens mount, a rib is formed between any adjacent two of the grooves, an end of each of the grooves closer to the first end is defined as a third end, an end of each of the grooves closer to the second end is defined as a fourth end, a width of each of the grooves along a circumferential direction is increasing from the fourth end toward the third end.

11. The lens module of claim 10, wherein a contour of each of the grooves is an isosceles trapezoid when observed along a radial direction.

12. The lens module of claim 10, wherein a contour of each of the grooves is a trapezoid with lateral sides different in length when observed along a radial direction.

13. The lens module of claim 10, wherein a bottom face of each of the grooves is inclined with respect to the axial direction, a second angle between the bottom face of each of the grooves and the axial direction is larger than 0 degree but smaller than 45 degrees.

14. The lens module of claim 10, wherein a depth of each of the grooves along a radial direction is increasing from the fourth end toward the third end.

15. The lens module of claim 10, wherein an end of each of the ribs closer to the first end is formed with a guiding face, the guiding face faces the first end and the axial direction.

16. The lens module of claim 13, wherein the second angle is ranged between 3-10 degrees.

17. The lens module of claim 10, wherein a first angle between two lateral walls of each of the grooves is larger than 0 degree but smaller than 90 degrees.

18. The lens module of claim 16, wherein the first angle is ranged between 15-25 degrees, the second angle is ranged between 3-10 degrees.

* * * * *